(12) United States Patent
Wakabayashi et al.

(10) Patent No.: US 7,670,695 B2
(45) Date of Patent: Mar. 2, 2010

(54) LUBRICANT FOR RECORDING MEDIUM AND MAGNETIC DISK

(75) Inventors: Akinobu Wakabayashi, Kobe (JP); Yasuo Sakane, Kobe (JP)

(73) Assignee: MORESCO Corporation, Hyogo (JP)

( * ) Notice: Subject to any disclaimer, the term of this patent is extended or adjusted under 35 U.S.C. 154(b) by 523 days.

(21) Appl. No.: 11/628,158

(22) PCT Filed: Jul. 14, 2005

(86) PCT No.: PCT/JP2005/012997
§ 371 (c)(1),
(2), (4) Date: Nov. 30, 2006

(87) PCT Pub. No.: WO2006/009057
PCT Pub. Date: Jan. 26, 2006

(65) Prior Publication Data
US 2008/0020171 A1 Jan. 24, 2008

(30) Foreign Application Priority Data
Jul. 23, 2004 (JP) .................. 2004-240118

(51) Int. Cl.
*G11B 5/65* (2006.01)
(52) U.S. Cl. ............... 428/833.3; 508/422; 508/582
(58) Field of Classification Search ............... 428/65.8, 428/421, 833.3, 833.4, 833.6, 835.8, 835.7, 428/841.3, 843.4, 843.5; 508/548, 422, 517, 508/582, 425, 556, 562, 427; 558/80; 564/505
See application file for complete search history.

(56) References Cited

U.S. PATENT DOCUMENTS

| | | | |
|---|---|---|---|
| 6,605,335 B2 | 8/2003 | Tani et al. | |
| 6,608,009 B2 * | 8/2003 | Akada et al. | 508/422 |
| 2006/0229217 A1 * | 10/2006 | Liu et al. | 508/422 |

FOREIGN PATENT DOCUMENTS

JP   A-2000-260017   9/2000

(Continued)

OTHER PUBLICATIONS

Perfluoropolyethers: Intramolecular Disproportionation, Paul H. Kasai, *Macromolecules*, 1992, 25, p. 6791-6799.

*Primary Examiner*—Holly Rickman
*Assistant Examiner*—Lisa Chau
(74) *Attorney, Agent, or Firm*—Posz Law Group, PLC

(57) ABSTRACT

The present invention provides a lubricant for recording media that does not readily decompose, and which has high adhesion to recording media, and a magnetic disk that is durable against continuous sliding under high-speed rotation.

The present invention provides a lubricant for recording media containing:
a perfluoropolyether compound represented by Formula (1),

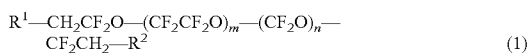

(1)

wherein $R^1$ represents

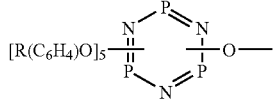

R represents a $C_{1-4}$ haloalkyl group, $R^2$ represents —$OCH_2CH(OH)CH_2OH$, and m and n are each independently 1-30; and
another perfluoropolyether compound represented by Formula (2),

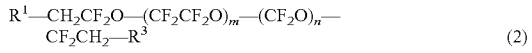

(2)

wherein $R^1$, m and n are as defined above and $R^3$ represents —$OCH_2CH(OH)CH_2OCH_2CH(OH)CH_2OH$. The present invention also provides a magnetic disk having a lubricating layer essentially consists of such a lubricant.

2 Claims, 1 Drawing Sheet

FOREIGN PATENT DOCUMENTS

| | | |
|---|---|---|
| JP | A-2003-217110 | 7/2003 |
| JP | A-2003-288715 | 10/2003 |
| JP | A-2004-152460 | 5/2004 |
| WO | WO 2004-031261 | 4/2004 |

* cited by examiner

LUBRICANT FOR RECORDING MEDIUM AND MAGNETIC DISK

TECHNICAL FIELD

The present invention relates to a lubricant for magnetic disks, magnetic tapes and like recording media, and to a magnetic disk comprising a lubricating layer formed by using the lubricant.

BACKGROUND ART

As lubricants for magnetic disks, perfluoropolyether compounds are generally used. Among various perfluoropolyether compounds, Fomblin-based (product of Solvay Solexis K.K.) compounds having low surface energies and low frictional forces are most frequently used. Fomblin-based compounds are perfluoropolyether compounds wherein the basic skeleton of its main chain is $(CF_2CF_2O)_m(CF_2O)_n$.

However, it is known that Fomblin-based compounds react with alumina ($Al_2O_3$) contained in head members, so that cleavage of the main chain can occur (Macromolecules, 1992, Vol. 25, pp. 6791-6799). As this cleavage progresses, the perfluoropolyether is depolymerized and eventually volatilized from the magnetic disk.

There are two modes for driving a magnetic disk drive, namely contact start/stop (CSS) wherein the head and the disk come into contact when the device starts or stops, and ramp loading/unloading (L/UL) wherein the head retracts to outside the disk surface when the device stops. The properties required of a lubricant vary depending on the mode employed.

In recent years, there has been a demand for increased storage densities and processing speeds of disk units. In order to meet such demand, it is necessary to decrease the distance between the head and disk (flying height) and/or accelerate the rotation of the disk. Even in the L/UL mode, wherein the head basically does not come into contact with the disk, with a decrease in flying height and increase in rotational speed, the head comes into contact with the disk more often, and this results in transfer of the lubricant from the surface of the disk to the head and/or splashing of the lubricant beyond the disk. This may damage the disk, and therefore a lubricant having a strong adhesion to the surface of the disk is preferable. An example of such a lubricant is a Fomblin-based perfluoropolyether compound having a plurality of polar groups (e.g., "Z-Tetraol", product of Solvay Solexis K.K.); however, this lubricant cannot solve the problems with decomposition due to alumina.

Compounds in which an end of the perfluoropolyether skeleton is modified with a phosphazene functional group (specifications of U.S. Pat. Nos. 6,608,009 and 6,605,335) are known as examples of compounds that can reduce decomposition due to alumina despite containing a perfluoropolyether chain. These compounds prevent decomposition due to alumina by the effect of the modifying phosphazene functional group. These compounds have a high compatibility with other perfluoropolyether compounds and have an excellent CSS resistance. However, they have a low adhesion to the disk surface and therefore are not particularly preferable as lubricants for use in the L/UL mode.

In order to increase the speed of recording/reading of information, it is expected that rotational speeds of magnetic disks will reach 15,000 rpm or more in the near future. As the rotational speed of a magnetic disk increases, the amount of lubricant splashed tends to be increased. If sliding is conducted for a long time while rotating the disk at a high speed, the lubricating layer becomes thin due to decomposition, and the magnetic disk eventually breaks. In order to surely obtain reliability of magnetic disk drives, use of a lubricant having a strong adhesion to the magnetic disk and which dose not readily decompose is necessary.

DISCLOSURE OF INVENTION

Problem to be Solved by the Invention

An object of the present invention is to provide a recording media lubricant having a strong adhesion to a recording medium and which does not readily decompose.

Means for Solving the Problem

The present invention provides a lubricant for recording media and a magnetic disk as described below.

Item 1. A lubricant for recording media containing:

a perfluoropolyether compound represented by Formula (1),

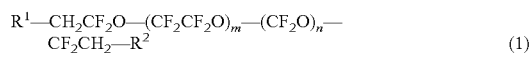
(1)

wherein $R^1$ represents

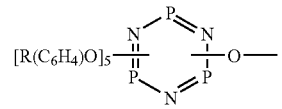

R represents a $C_{1-4}$ haloalkyl group, $R^2$ represents —$OCH_2CH(OH)CH_2OH$, and m and n are each independently 1-30; and another perfluoropolyether compound represented by Formula (2),

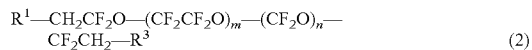
(2)

wherein $R^1$, m and n are as defined above and $R^3$ represents —$OCH_2CH(OH)CH_2OCH_2CH(OH)CH_2OH$.

Item 2. A magnetic disk obtained by sequentially forming a recording layer and a protective layer on a support, and forming a lubricating layer essentially consists of the lubricant of Item 1 on the surface of the protective layer.

The present invention is explained in detail below.

The perfluoropolyether compound contained in the lubricant for recording media of the present invention has a cyclotriphosphazene functional group at one end of the perfluoropolyether chain, and a plurality of hydroxyl groups derived from a glycol skeleton at the other end.

The lubricant for recording media of the present invention is produced, for example, by the following process.

A perfluoropolyether compound having a main chain represented by the formula below,

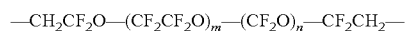

wherein m and n are each independently 1-30, and having a cyclotriphosphazene functional group at one end and one hydroxyl group at the other end is mixed with potassium t-butoxide and t-butanol, followed by stirring at 70° C. for 30 minutes. After the completion of dissolution of the potassium t-butoxide, 0.5 to 2.0 equivalent of 2,3-epoxy-1-propanol is gradually added dropwise to the resultant solution over 2 hours while stirring at 70° C. After the completion of addition, the resultant mixture is further stirred at 70° C. for another 2 hours. After the completion of the reaction, the mixture is subjected to extraction using a perfluorocarbon-based solvent, and the solvent is removed by distillation, obtaining a viscous liquid. The thus-obtained viscous liquid contains a perfluoropolyether compound represented by the above Formula (1), a perfluoropolyether compound represented by the above Formula (2), and a perfluoropolyether compound represented by Formula (3),

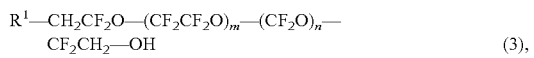

wherein $R^1$ represents

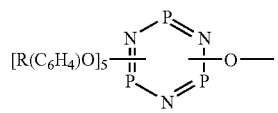

R is a $C_{1-4}$ haloalkyl group, and m and n are each independently 1-30.

This ternary mixture may be used as the lubricant for recording media of the present invention without modification, but may be purified by column chromatography, super-critical carbon dioxide extraction method, or other purification method.

A preferable example of a lubricant for recording media is a mixture that contains not less than 50 wt % of perfluoropolyether compounds represented by Formula (1) and Formula (2), wherein the content of perfluoropolyether compound represented by Formula (1) is not less than 30 wt %. A more preferable example of a lubricant for recording media is a mixture that contains not less than 70 wt % of perfluoropolyether compounds represented by Formula (1) and Formula (2), wherein the content of perfluoropolyether compound represented by Formula (1) is not less than 40 wt %.

"Moresco Phosfarol A20H", a product of Matsumura Oil Research Corp., is a specific example of a raw material perfluoropolyether compound having a —$CH_2CF_2O$—$(CF_2CF_2O)_m$—$(CF_2O)_n$—$CF_2CH_2$— main chain, wherein m and n are each independently 1-30, and having a cyclotriphosphazene functional group at one end and a hydroxyl group at the other end. The chemical structure of this compound is $(CF_3C_6H_4O)_5$—$P_3N_3$—$CH_2CF_2O$—$(CF_2CF_2O)_m$—$(CF_2O)_n$ —$CF_2CH_2OH$, wherein —$P_3N_3$— represents a cyclotriphosphazene ring, m and n are each independently 1-30, and the number average molecular weight is about 1300 to 8000.

One example of an application of the lubricant for recording media of the present invention is as a lubricant for improving the sliding properties of a magnetic disk in a magnetic disk unit. Such application aims at reducing the coefficient of friction between the magnetic disk and a head, and therefore the lubricant of the present invention may also be used as a lubricant for use in a recording unit other than a magnetic disk, wherein sliding occurs between a magnetic tape or like recording medium and a head. The lubricant of the present invention may be used as a lubricant for a unit, not limited to a recording unit, that comprises a part involved in sliding.

Note that the lubricant of the present invention exhibits an effect for preventing decomposition of a Fomblin-based perfluoropolyether compound, and therefore it can be used together with a Fomblin-based lubricant. The lubricant of the present invention can be used together with lubricants other than Fomblin-based lubricants, such as "Demnum SA" (product of Daikin Industries Ltd.) and "Krytox" (product of DuPont).

The magnetic disk of the present invention is formed by sequentially forming a recording layer and a protective layer on a support, and then forming a lubricating layer comprising the above-described lubricant for recording media on the surface of the protective layer.

FIG. 1 shows a schematic structure (cross section) of one example of a magnetic disk of the present invention.

In FIG. 1, the magnetic disk of the present invention comprises a recording layer 2 on a support 1, a protective layer 3 on the recording layer 2, and a lubricating layer 4 comprising the above-described lubricant for recording media on the surface of the protective layer 3 as the outermost layer.

Examples of materials for support 1 include aluminum alloys, glasses, polycarbonates, etc. Examples of materials for recording layer 2 include alloys obtained by adding chromium, platinum, tantalum, etc., to iron, cobalt, nickel and like elements that can form a ferromagnetic substance, and oxides thereof. The recording layer 2 can be formed by subjecting these materials to electroplating, sputtering, etc. Examples of materials for protective layer 3 include diamond-like carbon, $Si_3N_4$, SiC, $SiO_2$, etc. The protective layer 3 can be formed by subjecting these materials to sputtering, CVD, etc.

The lubricating layer 4 is formed by dissolving the lubricant for recording media of the present invention in a solvent, and usually subjecting the resultant solution to dipping. Solvents that can solve the lubricant for recording media of the present invention can be used in the present invention. Specific examples of usable solvents include fluorocarbon-based solvents (e.g., "PF-5060", "PF-5080", "HFE-7100" and "HFE-7200", products of Sumitomo 3M Limited; and "VERTREL XF", product of DuPont).

EFFECTS OF THE INVENTION

Because the lubricant for recording media of the present invention has a strong adhesion to recording media, splashing lubricant can be reduced, and the lubricant does not easily decompose. A magnetic disk comprising a lubricating layer formed by using the above-described lubricant can withstand continuous sliding under high-speed rotation, and therefore a magnetic disk drive provided with such a magnetic disk achieves the recording/reading of information at high speed.

Figure 1:
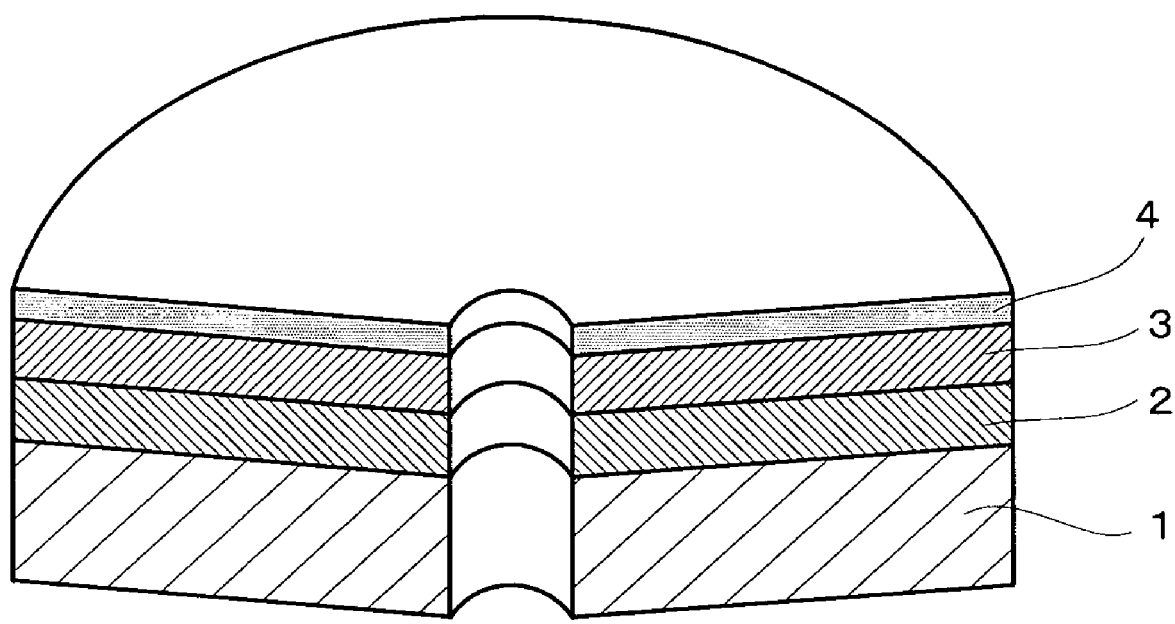
FIG. 1 shows a schematic sectional view of one example of a magnetic disk of the present invention.

EXPLANATION OF NUMERICAL SYMBOLS 1 support
2 recording layer
3 protective layer
4 lubricating layer

BEST MODE FOR CARRYING OUT THE INVENTION

The present invention is explained in detail below with reference to Examples.

Example 1

Twenty-two grams (7.11 mmol) of "Moresco Phosfarol A20H-2000" (product of Matsumura Oil Research Corp.), 0.1 g (0.71 mmol) of potassium t-butoxide and 13.0 ml of t-butanol were mixed under an argon atmosphere and stirred at 70° C. for 30 minutes. After completion of dissolution of the potassium t-butoxide, 0.6 g (7.11 mmol) of 2,3-epoxy-1-propanol was added to the resultant mixture dropwise over 2 hours while stirring at 70° C. After completion of the addition, the mixture was further stirred at 70° C. for 2 hours. After completion of the reaction, "VERTREL XF" (product of DuPont) was added to the reaction mixture and the resultant mixture was then subjected to extraction, followed by washing with an aqueous solution obtained by mixing 1 N hydrochloric acid and methanol. The "VERTREL XF" was removed by distillation, obtaining 14.0 g of a viscous liquid.

The thus-obtained viscous liquid was subjected to $^{19}$F-NMR analysis and $^1$H-NMR analysis to obtain the number average molecular weight and the proportions of the constituent components (wt %). The number average molecular weight thereof was 2929. Table 1 shows the proportions of the constituent components. In Table 1, Compound of Formula (1) is a perfluoropolyether compound represented by the above Formula (1) wherein R is a trifluoromethyl group. Compound of Formula (2) in Table 1 is a perfluoropolyether compound represented by the above Formula (2) wherein R is a trifluoromethyl group. Compound of Formula (3) in Table 1 is a perfluoropolyether compound represented by the above Formula (3) wherein R is a trifluoromethyl group.

TABLE 1

| | Weight % |
|---|---|
| Compound of Formula (1) | 43 |
| Compound of Formula (2) | 28 |
| Compound of Formula (3) | 29 |

Results of $^{19}$F-NMR analysis are shown below.

$^{19}$F-NMR (without solvent. Reference: $OCF_2CF_2CF_2CF_2O$ in the resultant product was defined as −125.8 ppm.):

δ=−78.6 ppm, −80.6 ppm [2F,Rf—[$CF_2CH_2$—O—$P_3N_3$—($OC_6H_4CF_3$)$_5$]];

δ=−77.8 ppm, −79.9 ppm [2F,Rf—[$CF_2CH_2$—O—$CH_2CH(OH)CH_2OH$]].

Trifluoroacetylation was conducted as a pretreatment for the $^1$H-NMR analysis. The trifluoroacetylation procedure was as follows. To the viscous liquid (0.2 g) was added 10 times the weight of trifluoroacetic anhydride (2.0 g), followed by stirring at room temperature for 12 hours. After completion of stirring, excess trifluoroacetic anhydride was removed, giving a trifluoroacetylated substance.

Results of $^1$H-NMR analysis are shown below.

$^1$H-NMR [trifluoroacetylated substance] (solvent: perfluorohexane. Reference: deuterium oxide $D_2O$):

δ=3.70-4.05 ppm [4H,Rf—[$CF_2CH_2$—O—$\underline{CH_2}$CH(OAc)$CH_2$OAc]];

δ=3.70-4.05 ppm [2H,Rf—[$CF_2\underline{CH_2}$—O—$P_3N_3$—($OC_6H_4CF_3$)$_5$]];

δ=4.45-4.70 ppm [2H,Rf—[$CF_2\underline{CH_2}$—O—$CH_2CH(OAc)CH_2OAc$]];

δ=5.25-5.35 ppm [1H,Rf—[$CF_2CH_2$—O—$CH_2CH(OAc)CH_2OCH_2\underline{CH}(OAc) CH_2OAc$]];

δ=5.37-5.57 ppm [1H,Rf—[$CF_2CH_2$—O—$CH_2\underline{CH}(OAc)CH_2OAc$]].

Example 2

Sixty-seven grams (0.022 mol) of "Moresco Phosfarol A20H-2000" (product of Matsumura Oil Research Corp.), 0.3 g (0.002 mol) of potassium t-butoxide and 30.0 ml of t-butanol were mixed under an argon atmosphere and stirred at 70° C. for 30 minutes. After completion of dissolution of the potassium t-butoxide, 2.0 g (0.022 mol) of 2,3-epoxy-1-propanol was added dropwise to the resultant mixture over 2 hours while stirring at 70° C. After completion of the addition, the mixture was further stirred at 70° C. for 2 hours. After completion of the reaction, "VERTREL XF" (product of DuPont) was added to the reaction mixture and the resultant mixture was then subjected to extraction, followed by washing using an aqueous solution obtained by mixing 1 N hydrochloric acid with methanol. The "VERTREL XF" was removed by distillation and then purified by supercritical carbon dioxide extraction method, obtaining 22.3 g of a viscous liquid.

The thus-obtained viscous liquid was subjected to $^{19}$F-NMR analysis and $^1$H-NMR analysis to obtain the number average molecular weight and the proportions of the constituent components (wt %). The number average molecular weight thereof was 3130. Table 2 shows the proportions of the constituent components. The compounds of Formulae (1), (2) and (3) in Table 2 are the same as those in Table 1.

TABLE 2

| | Weight % |
|---|---|
| Compound of Formula (1) | 80 |
| Compound of Formula (2) | 5 |
| Compound of Formula (3) | 15 |

The chemical shifts obtained by NMR analysis are the same as those of Example 1.

The viscous liquids (lubricants) obtained in Examples 1 and 2 were subjected to bonded percentage measurement and testing for evaluating decomposition resistance against alumina.

[Bonded Percentage Measurement]

The viscous liquids (lubricants) obtained in Examples 1 and 2 were dissolved in "VERTREL XF" (product of DuPont), preparing lubricant solutions (0.1 wt %). Respective glass media magnetic disks having a diameter of 2.5 inches were dipped in the lubricant solutions for 1 minute and lifted out at 2 mm/s, thereby lubricant was applied to each glass media magnetic disk. Each glass media magnetic disk was heated by being placed in a 100° C. thermostatic chamber for 20 minutes. The thickness of the lubricant on each disk was measured by using an ellipsometer (this thickness is defined as e Å). The disk was then dipped in "VERTREL XF"

for 10 minutes and lifted out at 10 mm/s, removing non-adhered lubricant to the disk. The thickness of the lubricant remaining on the disk was measured by using an ellipsometer (this thickness is defined as f Å). The strength of the adhesion to the disk was evaluated using the bonded percentage expressed by the following equation. Table 3 shows the results.

Bonded percentage(%)=100×$f/e$

Among the compounds represented by Formulae (1), (2) and (3) contained in the viscous liquids (lubricants) obtained in Examples 1 and 2, the compound represented by Formula (3) was removed by the above-described removal process. Therefore, only the compounds represented by Formulae (1) and (2), which have a strong adhesion, remained on the disk.

For comparison, using perfluoropolyether compounds, "Moresco Phosfarol A20H-2000", product of Matsumura Oil Research Corp., and "Zdol-4000" and "Z-Tetraol-2000S", products of Solvay Solexis K.K., bonded percentages were measured in the same manner described above. Table 3 shows the results.

TABLE 3

| Test Sample | Bonded percentage (%) |
| --- | --- |
| Viscous liquid of Example 1 | 24 |
| Viscous liquid of Example 2 | 25 |
| A20H-2000 | 1 |
| Zdol-4000 | 8 |
| Z-Tetraol-2000S | 14 |

As is clear from Table 3, the viscous liquids (lubricants) obtained in Examples 1 and 2 form a lubricating layer strongly adhered to the magnetic disk. Because of this, reduction in the splashing of lubricant can be expected.

[Decomposition Resistance Against Alumina]

Alumina powder (average particle diameter of 100 μm) was added to each of the viscous liquids (lubricants) obtained in Examples 1 and 2, "Moresco Phosfarol A20H-2000", product of Matsumura Oil Research Corp., and "Zdol-4000" and "Z-Tetraol-2000S", products of Solvay Solexis K.K., in such a manner that the alumina powder content became 20 wt %, and mixed for at least 15 minutes using a shaker. Uniformly mixed test samples were subjected to a decomposition resistance test by heating using a thermal analyzer (TG/DTA). The test was conducted by placing a specific weight of each test sample with or without alumina in aluminum containers, heating the samples at 250° C. under a nitrogen atmosphere, and evaluating the decrease in the weights of the test samples. Table 4 shows the results.

TABLE 4

| | Decrease in weight (%) | | | |
| --- | --- | --- | --- | --- |
| | Without alumina | | With alumina | |
| Test Sample | After 100 min. | After 200 min. | After 100 min. | After 200 min. |
| Viscous liquid of Example 1 | 2 | 3 | 5 | 9 |
| Viscous liquid of Example 2 | 2 | 3 | 4 | 7 |
| A20H-2000 | 5 | 9 | 6 | 8 |
| Zdol-4000 | 15 | 28 | 33 | 100 |
| Z-Tetraol-2000S | 26 | 37 | 39 | 97 |

As is clear from Table 4, the viscous liquids (lubricants) obtained in Examples 1 and 2 have excellent decomposition resistance against alumina.

Example 3

The viscous liquid (lubricant) obtained in Example 1 was dissolved in "VERTREL XF", product of DuPont, preparing a lubricant solution (0.1 wt %). A glass media magnetic disk comprising a support, a recording layer, and a protective layer, and having a diameter of 2.5 inches was dipped in the lubricant solution for 1 minute and lifted out at 2 mm/s, thereby lubricant was applied to the glass media magnetic disk. The glass media magnetic disk was heated by being placed in a 100° C. thermostatic chamber for 20 minutes. The disk was then dipped in "VERTREL XF" for 10 minutes and lifted out at 10 mm/s, removing non-adhered lubricant. The thickness of the lubricant remaining on the disk was measured using an ellipsometer. The thickness of the lubricant remained was 4.9 Å.

The invention claimed is:

1. A lubricant for recording media containing:
   a perfluoropolyether compound represented by Formula (1), $R^1$—CH$_2$CF$_2$O—(CF$_2$CF$_2$O)$_m$—(CF$_2$O)$_n$—CF$_2$CH$_2$—$R^2$ (1)

wherein $R^1$ represents

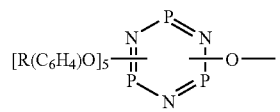

R represents a C$_{1-4}$ haloalkyl group, $R^2$ represents —OCH$_2$CH(OH)CH$_2$OH, and m and n are each independently 1-30; and
   another perfluoropolyether compound represented by Formula (2), $R^1$—CH$_2$CF$_2$O—(CF$_2$CF$_2$O)$_m$—(CF$_2$O)$_n$—CF$_2$CH$_2$—$R^3$ (2)

wherein $R^1$, m and n are as defined above and $R^3$ represents —OCH$_2$CH(OH)CH$_2$OCH$_2$CH(OH)CH$_2$OH.

2. A magnetic disk obtained by sequentially forming a recording layer and a protective layer on a support, and forming a lubricating layer essentially consisting of the lubricant of claim 1 on the surface of the protective layer.

* * * * *